United States Patent [19]

Schoeps

[11] 4,191,282

[45] Mar. 4, 1980

[54] DEVICE FOR TIGHTENING A SCREW JOINT

[75] Inventor: Knut C. Schoeps, Tyreso, Sweden

[73] Assignee: Atlas Copco Aktiebolag, Nacka, Sweden

[21] Appl. No.: 886,774

[22] Filed: Mar. 15, 1978

[30] Foreign Application Priority Data

Mar. 22, 1977 [SE] Sweden ............................ 7703257

[51] Int. Cl.[2] ........................ F16P 5/00; F16D 43/20

[52] U.S. Cl. ................................ 192/0.034; 192/150

[58] Field of Search ................ 192/0.034, 150; 173/12

[56] References Cited

U.S. PATENT DOCUMENTS

| | | | |
|---|---|---|---|
| 2,964,151 | 12/1960 | Eckman | 192/0.034 |
| 3,195,704 | 7/1965 | Linsker | 192/150 |
| 3,275,116 | 9/1966 | Martin | 192/150 |
| 3,955,662 | 5/1976 | Thackston | 192/150 |

*Primary Examiner*—Rodney H. Bonck
*Attorney, Agent, or Firm*—Frishauf, Holtz, Goodman, Woodward

[57] ABSTRACT

A device for tightening screw joints, comprising a pressure fluid motor, an overload friction type slip clutch, a pressure fluid shut off valve and a release mechanism for initiating closing of said shut off valve at slipping of said overload clutch. The release mechanism comprises a female member associated with one of the slip clutch halves and a male member associated with the other of the slip clutch halves, and when aligned with said female member receivable thereinto. The release mechanism also comprises a guide means for urging against a biasing means said male member into alignment with said female member upon relative rotation of the slip clutch halves.

8 Claims, 3 Drawing Figures

DEVICE FOR TIGHTENING A SCREW JOINT

This invention relates to a device for tightening screw joints. In particular the invention relates to a pressure fluid powered device for tightening screw joints, comprising a friction type slip clutch.

A problem concerned with screw tightening devices of the above kind is how to obtain an automatic shut off of the pressure fluid supply as the friction slip clutch starts slipping. An important fact to consider is that a friction slip clutch may occupy when reengaging any position as it is reengaged after release, which means that there is no predetermined relative position or positions in which the clutch halves tend to reengage. This means in turn that a shut off means intended for a clutch of this type has to work properly whatever the actual relative position of the clutch halves may be.

The invention intends to solve the above problem, which is accomplished by the device defined in the claims.

DETAILED DESCRIPTION

Figure 1:
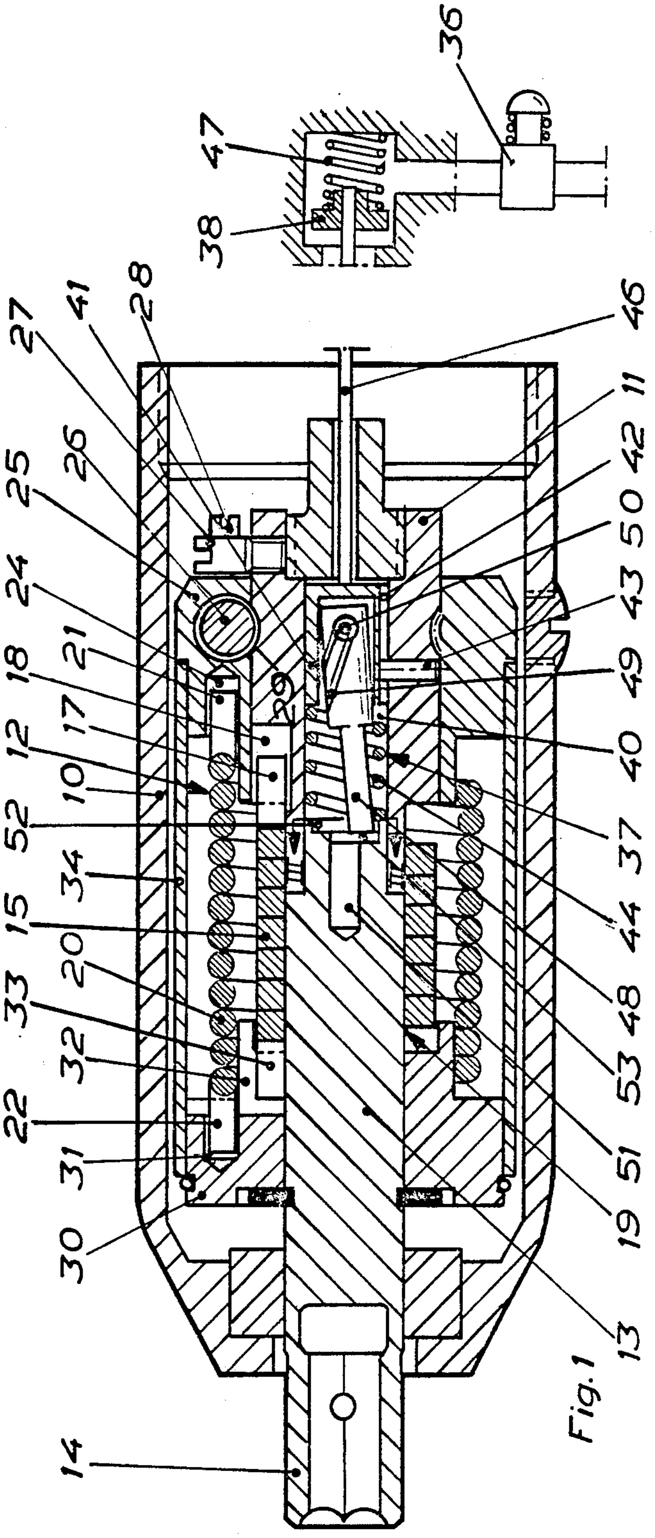
FIG. 1 shows a longitudinal section through the forward part of a pneumatic nut runner and, schematically, the pressure air shut off valve of the nut runner in open position.

In FIG. 1, 10 designates the housing of the nut runner. The housing encloses a pneumatic motor (not shown) to which is connected a driving clutch half 11 of a torque responsive slip clutch 12. The slip clutch further comprises a driven clutch half 13 connected to an output shaft 14 and a coil type friction spring 15 which is arranged to transmit torque from the driving clutch half 11 to the driven clutch half 13.

For that purpose, the axially extending rear endpart 17 of the friction spring 15 is positively connected to the driving clutch half 11 via a recess 18 in the latter. The driven clutch half 13 has an external cylindrical friction surface 19 for cooperation with the internal surface of the friction spring 15. The latter transmits torque by means of its friction grip on the friction surface 19, which grip is accomplished by pre-tensioning of the spring 15. The characteristc feature of such a spring is that its friction grip is practically independent of the friction coefficient provided several windings of the spring are in engagement with the friction surface.

To make the friction spring 15 act as a slip clutch its rear end 17 has to be driven in the unwinding direction of the spring.

The nut runner comprises an auxiliary spring 20 which has rear and forward axially extending ends 21 and 22, respectively. The rear end 21 of the auxiliary spring 20 is received in a bore 24 in a setting ring 25 which is rotatively supported on the driving clutch half 11. The setting ring 25 is rotatable relative to the driving clutch half 11 by means of a screw which engages a thread 29 on the outer periphery of the driving clutch half 11 thereby constituting a worm gear. Stop screws 27 and 28 are provided to limit the rotation movement of the setting ring 25 relative to the driving clutch half 11.

The forward end 22 of the auxiliary spring 20 is positively connected to a coupling sleeve 30 via an axial bore 31 in the latter. The coupling sleeve 30 is journalled on the driven clutch half 13 so as to be able to rotate freely relative thereto. The coupling sleeve 30 further comprises a recess 32 in which is received the forward end 33 of the friction spring 15.

According to the above described arrangement, the auxiliary spring 20 is connected in parallel relationship to the friction spring 15 and acts between the ends 17 and 33 of the latter. This means that a torsion load is appliable on the friction spring 15 in order to increase or decrease the friction grip of the latter.

The auxiliary spring 20 can be arranged either to act in the winding direction of the friction spring 15, thereby increasing the pre-tensioning and the friction grip of the latter, or to act in the unwinding direction of the friction spring 15, thereby neutralizing to some extent the pre-tensioning and the friction grip of the latter. The direction of action as well as the pre-tensioning magnitude of the auxiliary spring 20 can be set by rotating the setting ring 25 by turning the screw 26.

The slip clutch 12 is covered by a protection tube 34 which is supported on the outer periphery of the setting ring 25 and the sleeve 30. As the slip torque level of this type of clutch is practically independent of the friction coefficient, the friction spring 15 may very well be lubricated with grease to avoid a too hard wear. The protection tube 34 prevents grease from being spread in the nut runner housing 10.

The nut runner shown in the drawing figures also comprises a pressure air supply valve 36 and an automatic shut off device. The shut off device comprises a release mechanism 37 and a shut off valve 38 operated by the release mechanism 37. The release mechanism comprises an axially extending bore 40 in the driving clutch half 11 in which is movably guided a cup 41. The latter is open toward the driven clutch half 13 and has an external, longitudinal groove 42 for cooperation with a key pin 43 secured in the driving clutch half 11, thereby preventing the cup 41 from rotating relative to the latter.

The cup 41 is biased rearwardly by a spring 44 acting between the forward end of the cup 41 and the rear end of the driven clutch half 13. A maneuver rod 46 connects the cup 41 with the shut off valve 38 which in turn is biased forwardly by a spring 47. Spring 47 is in the shown embodiment weaker than spring 44 but is supported by the air pressure to accomplish a closing force exceeding the load of spring 44.

The release mechanism 37 further comprises a release rod 48 the rear end of which is received in the cup 41, whereas the forward end thereof is arranged to cooperate with the rear end of the driven clutch half 13. The release rod 48 is pivotably mounted on a transverse pin 50 in the cup 41, and a spring 49 is also supported on the transverse pin 50 so as to act between the release rod 48 and the inner wall of the cup 41. The release pin 48 is thereby biased toward one side of the cup 41 and the bore 40.

Figure 3:
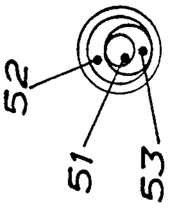
FIG. 3 shows a cross section along line III—III in FIG. 1.

The driven clutch half 13 is in its rear end provided with a concentric bore 51 the diameter of which is slightly larger than the diameter of the forward end of release rod 48. In its rear end the driven clutch half 13 is also provided with circular recesses 52 and 53 of which recess 52 is coaxial with bore 51 and the driven clutch half 13 while recess 53 is excentrically located. Recess 53 is of such a diameter and is so located as to constitute a circular tangent to recess 52 as well as to bore 51. See FIG. 3.

During tightening of a screw joint supply valve 36 as well as shut off valve 38 are open. The forward directed load upon the maneuver rod 46 from spring 47 and the motive air pressure exceeds backward directed force exerted by spring 44, which means that cup 41 and release rod 48 are urged forwardly. Due to the action of spring 49 the forward end of release rod 48 is brought into a lateral position in recess 52 and is prevented from moving forwards in that it abuts against the bottom of recess 52 or recess 53.

Figure 2:
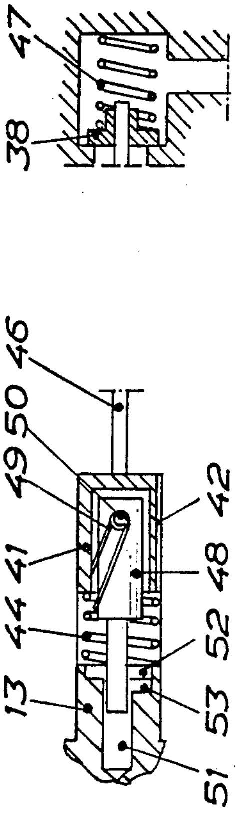
FIG. 2 shows, schematically, the air shut off valve in closed position.

When reaching the slip torque level of the slip clutch 12 a relative rotation takes place between driving clutch half 11 and driven clutch half 13. Release rod 48 is then rotated relative to recesses 52 and 53 in that the cup 41 is locked as regards relative rotation to the driving clutch half 11. At first, the forward end of release pin 48 will follow the inner contour of the concentric recess 52, and, when reaching the tangent point between recess 52 and excentric recess 53 the release rod 48 is moved forwards to abut against the bottom of recess 53. Now, rod 48 will follow the inner contour of recess 53 until it reaches the tangent point between recess 53 and the bore 51. At this moment the forward end of release rod 48 falls down into bore 51, and the cup 41, the maneuver rod 46 and shut off valve 38 are displaced forwards. The shut off valve 38 is closed. This position is illustrated in FIG. 2.

The release mechanism is re-set in that the supply valve 36 is closed. The spring 47 then looses its support from the pressure air and is not able to withstand the load of spring 44 and maintain valve 38 in closed position. The cup 41, release rod 48, maneuver rod 46 and shut off valve 38 is then reclosed, and the release rod 48 is pivoted into a tilted position by means of spring 49.

The characteristic features of the release mechanism 37 as regards operation are specifically related to the characteristic of the above described slip clutch 12. The latter is characterized in that, after a completed tightening operation, including slippage at the desired maximum torque level, it stops in any position and does not tend to seek for any specific reengagement position defined by a certain angular relationship between the driving and driven clutch halves. This means that the release mechanism of the automatic shut off device has to work properly whichever the angular relationship between the clutch halves is. The release mechanism described above and shown in the figures releases within a relative rotation between the clutch halves of 1½ revolution from the start of the overload slippage, no matter what the relative start position might be.

The embodiments of the invention are not limited to the shown and described example but can be freely varied within the scope of the invention as it is defined in the claims.

What we claim is:

1. In a device for tightening screw joints, comprising a pressure fluid motor, an overload, friction type slip clutch including a driving half (11) and a driven half (13), an output shaft (14) for connection to a screw joint member, a pressure fluid shut off valve (38), and a release mechanism for initiating closing of the shut off valve at overload clutch slipping, the improvement comprising:

a male member (48) which is associated with one of said clutch halves for co-rotation therewith, a female member comprising a bore (51) and which is associated with the other of said clutch halves for co-rotation therewith, and which is adapted to engagingly receive said male member (48), one of said male and female members (48,51) being movable relative to the other between a laterally offset position and an axially aligned position, and being also axially movable relative to the other between an engaged position and a separated position, first biasing means (49) for biasing said one of said male and female members (48,51) toward said laterally offset position, second biasing means (47) for biasing said one of said male and female members axially toward said engaged position, and guide means comprising two circular recesses (52,53) arranged such that the cross-section of at least said bore (51) is disposed within the cross-sectional confines and is tangent to at least one of said circular recesses (52,53), said circular recesses being located at the male member (48) facing end of said bore (51) and associated with said male and female members (48,51) for urging, against the action of said first biasing means (49), said male and female members (48,51) relative to each other from said laterally offset position to said axially aligned position upon relative rotation between said clutch halves (11,13), thereby providing for relative axial movement of said members (48,51) from said separated position to said engaged position by action of said second biasing means (47).

2. Device according to claim 1, wherein said male member (48) is associated with the driving clutch half (11), and further comprising coupling means (42,43) on said male member (48) and the driving clutch half (11) by means of which said male member (48) is rotatively locked to the driving clutch half (11) but axially movable thereto.

3. Device according to claim 2, comprising a maneuver rod (46) arranged to transfer axial movement from said male member (48) to the shut off valve (38).

4. Device according to claim 1, wherein said circular recesses (52,53) are excentrically located relative to each other, one of said circular recesses (53) having a smaller diameter than the other and being disposed within the other (52).

5. Device according to claim 4, wherein said smaller diameter circular recess (53) is tangent to said bore (51) as well as to the other circular recess (52).

6. Device according to claim 1, wherein said female member (51) comprises an axial bore in the rear end of the driven clutch half (13), and said male member (48) comprises a support rod which is rotatively locked but axially as well as laterally movable relative to the driving clutch half (11).

7. Device according to claim 6, comprising an axially displaceable cup member (41) coupled to and and tiltably supporting said support rod (48), and said first biasing means (49) comprises a spring acting radially between said cup member (41) and said support rod (48).

8. Device according to claim 7, comprising a maneuver rod (46) arranged to transfer axial movement from said cup member (41) to the shut off valve (38), and wherein said second biasing means (47) is associated with the shut off valve (38).

* * * * *